United States Patent
Rizzo, Jr.

(10) Patent No.: US 10,335,857 B2
(45) Date of Patent: Jul. 2, 2019

(54) METHOD OF MANUFACTURING GAS TURBINE ENGINE COMPONENT FROM A MOLYBDENUM-RICH ALLOY

(71) Applicant: United Technologies Corporation, Hartford, CT (US)

(72) Inventor: John P. Rizzo, Jr., Vernon, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 468 days.

(21) Appl. No.: 14/849,644

(22) Filed: Sep. 10, 2015

(65) Prior Publication Data
US 2016/0089722 A1 Mar. 31, 2016

Related U.S. Application Data

(60) Provisional application No. 62/055,680, filed on Sep. 26, 2014.

(51) Int. Cl.
| | |
|---|---|
| *B21J 5/00* | (2006.01) |
| *C22F 1/18* | (2006.01) |
| *F01D 5/28* | (2006.01) |
| *B23K 20/10* | (2006.01) |
| *B22F 3/20* | (2006.01) |

(Continued)

(52) U.S. Cl.
CPC .............. *B22F 3/20* (2013.01); *B21J 5/002* (2013.01); *B22F 1/0096* (2013.01); *B22F 3/17* (2013.01); *B22F 9/16* (2013.01); *B23H 7/00* (2013.01); *B23K 20/10* (2013.01); *B23K 26/352* (2015.10); *C22C 1/045* (2013.01); *C22C 27/04* (2013.01); *C22C 32/0005* (2013.01); *C22F 1/18* (2013.01); *B22F 2998/10* (2013.01); *F01D 5/28* (2013.01); *F01D 25/005* (2013.01); *F05D 2230/22* (2013.01); *F05D 2300/131* (2013.01); *F23R 2900/00018* (2013.01)

(58) Field of Classification Search
CPC .................................... C22C 27/04; B22F 3/20
See application file for complete search history.

(56) References Cited

U.S. PATENT DOCUMENTS 3,014,269 A    12/1961 Graham et al.
3,061,482 A *  10/1962 Grant ..................... C23C 24/00
                                                  148/281

(Continued)

FOREIGN PATENT DOCUMENTS

RU            2254200 C1    6/2005

OTHER PUBLICATIONS ("The Elements" and "Physical constants of inorganic compounds" in CRC Handbook of Chemistry and Physics, Internet Version 2005, p. 4-39, 4-19 (Year: 2005).*

(Continued)

*Primary Examiner* — Colleen P Dunn
*Assistant Examiner* — Rajinder Bajwa
(74) *Attorney, Agent, or Firm* — Carlson, Gaskey & Olds, P.C.

(57) ABSTRACT

A method for manufacturing a gas turbine engine component from a molybdenum-rich alloy. The method includes the steps of providing a molybdenum powder of at least 50% molybdenum by weight, extruding the molybdenum powder to provide a first shape, forming the first shape to a second shape and forging the second shape to provide a third shape.

18 Claims, 2 Drawing Sheets

(51) Int. Cl.
*B23K 26/352* (2014.01)
*B22F 1/00* (2006.01)
*B22F 3/17* (2006.01)
*C22C 1/04* (2006.01)
*B22F 9/16* (2006.01)
*B23H 7/00* (2006.01)
*C22C 27/04* (2006.01)
*C22C 32/00* (2006.01)
*F01D 25/00* (2006.01)

(56) References Cited

U.S. PATENT DOCUMENTS

| | | | |
|---|---|---|---|
| 3,286,502 A | 11/1966 | Cogan | |
| 3,412,611 A | 11/1968 | Eccles et al. | |
| 3,626,741 A | 12/1971 | Ham | |
| 4,479,833 A * | 10/1984 | Gessinger | C22F 1/00 148/514 |
| 4,950,151 A * | 8/1990 | Zachariades | B22F 3/20 156/244.11 |
| 5,620,537 A * | 4/1997 | Bampton | B21C 23/001 148/564 |
| 7,524,353 B2 | 4/2009 | Johnson, Jr. et al. | |
| 8,043,405 B2 | 10/2011 | Johnson, Jr. et al. | |
| 8,153,052 B2 | 4/2012 | Jackson et al. | |
| 2005/0133121 A1 | 6/2005 | Subramanian et al. | |
| 2009/0011266 A1 * | 1/2009 | Cochran | C22C 1/045 428/545 |
| 2009/0054275 A1 * | 2/2009 | Billiet | B22F 3/1021 508/100 |
| 2010/0009126 A1 * | 1/2010 | Leon | B64C 3/26 428/174 |
| 2010/0215978 A1 * | 8/2010 | Rice | B22F 5/04 428/577 |
| 2013/0028781 A1 | 1/2013 | Xu | |
| 2013/0189145 A1 * | 7/2013 | Saitoh | C23C 14/3414 419/31 |

OTHER PUBLICATIONS

"Conventional Hot Extrusion" ASM Handbook, vol. 14A: Metalworking: Bulk Forming S.L. Semiatin, editor, p. 421-439, 2005 (Year: 2005).*

"Forging of Refractory Metals", ASM Handbook, vol. 14A: Metalworking: Bulk Forming S.L. Semiatin, editor, p. 284-285, 2005 (Year: 2005).*

J.K. Cochran, et al., "Oxidation Resistant Mo-Mo2 B-Silka and Mo-Mo2 B-Silka Composites for High Temperature Applications", JOM; The Journal of Minerals, Metals & Materials Society (TMS), vol. 63, No. 12, Dec. 10, 2011, pp. 44-49.

Extended European Search Report for European Application No. 1518661915.9, dated Feb. 29, 2016.

* cited by examiner

METHOD OF MANUFACTURING GAS TURBINE ENGINE COMPONENT FROM A MOLYBDENUM-RICH ALLOY

CROSS-REFERENCE TO RELATED APPLICATIONS

This application claims priority to U.S. Provisional Application No. 62/055,680, which was filed on Sep. 26, 2014 and is incorporated herein by reference.

BACKGROUND

This disclosure relates to a method of manufacturing a gas turbine engine component from a molybdenum-rich alloy.

A gas turbine engine typically includes a fan section, a compressor section, a combustor section and a turbine section. Air entering the compressor section is compressed and delivered into the combustor section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

Portions of the gas turbine engine, particularly the combustor and turbine sections, typically run at temperatures that exceed the melting point of some components. Thermal barrier coatings and cooling fluids have been used to thermally protect the metallic components.

Engine designs continue to push the limits of components in pursuit of higher engine efficiency. As a result, temperatures within the engine continue to increase, requiring development of new component materials and manufacturing processes.

SUMMARY

In one exemplary embodiment, a method for manufacturing a gas turbine engine component from a molybdenum-rich alloy. The method includes the steps of providing a molybdenum powder of at least 50% molybdenum by weight, extruding the molybdenum powder to provide a first shape, forming the first shape to a second shape and forging the second shape to provide a third shape.

In a further embodiment of the above, the molybdenum powder is at least 75% molybdenum by weight.

In a further embodiment of any of the above, the molybdenum powder is in a range of 94-98% molybdenum by weight.

In a further embodiment of any of the above, the molybdenum powder has a diameter in a range of 750-3000 microns (0.030-0.120 inches).

In a further embodiment of any of the above, the molybdenum powder has a diameter in a range of 900-1800 microns (0.036-0.072 inches).

In a further embodiment of any of the above, the molybdenum is in a spherical form. The molybdenum powder includes silica and a non-cubic boron nitride.

In a further embodiment of any of the above, the molybdenum powder is synthesized in an alcohol solution containing boron nitride and silica.

In a further embodiment of any of the above, the powder is compacted to provide a density that is at least 75% of the finished part.

In a further embodiment of any of the above, the extrusion step is performed using forces around 5000 tons/ft$^2$ (480 MPa) and under temperatures in a range of 2500-4000° F. (1370-2200° C.).

In a further embodiment of any of the above, the forging step includes hot isothermal forging.

In a further embodiment of any of the above, the forging step is performed using forces around 5000 tons/ft$^2$ (480 MPa) and under temperatures in a range of 2500-4000° F. (1370-2200° C.).

In a further embodiment of any of the above, the extruding step includes providing an I-beam shaped die opening and extruding the compacted powder through the opening.

In a further embodiment of any of the above, the extruding step includes passing an extruded part through a pair of cylindrical dies.

In a further embodiment of any of the above, the extruded part provides at least a portion of at least one of a combustor, a stator, a blade outer air seal, a turbine exhaust case, an augmenter, a strut, and a high temperature bearing.

In a further embodiment of any of the above, the extruding step includes passing the extruded part from the pair of cylindrical dies through a pair of corrugated dies to provide an airfoil contour on the extruded part.

In a further embodiment of any of the above, the finishing process includes at least one of polishing, EDM, laser machining, ultrasonic machining, electrochemical machining and abrasive vibratory finishing.

In a further embodiment of any of the above, the forming step removes at least 20% of the material as compared to the first shape.

In a further embodiment of any of the above, the finished component is one of a combustor, a stator, a blade outer air seal, a turbine exhaust case, an augmenter, a strut, and a high temperature bearing.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
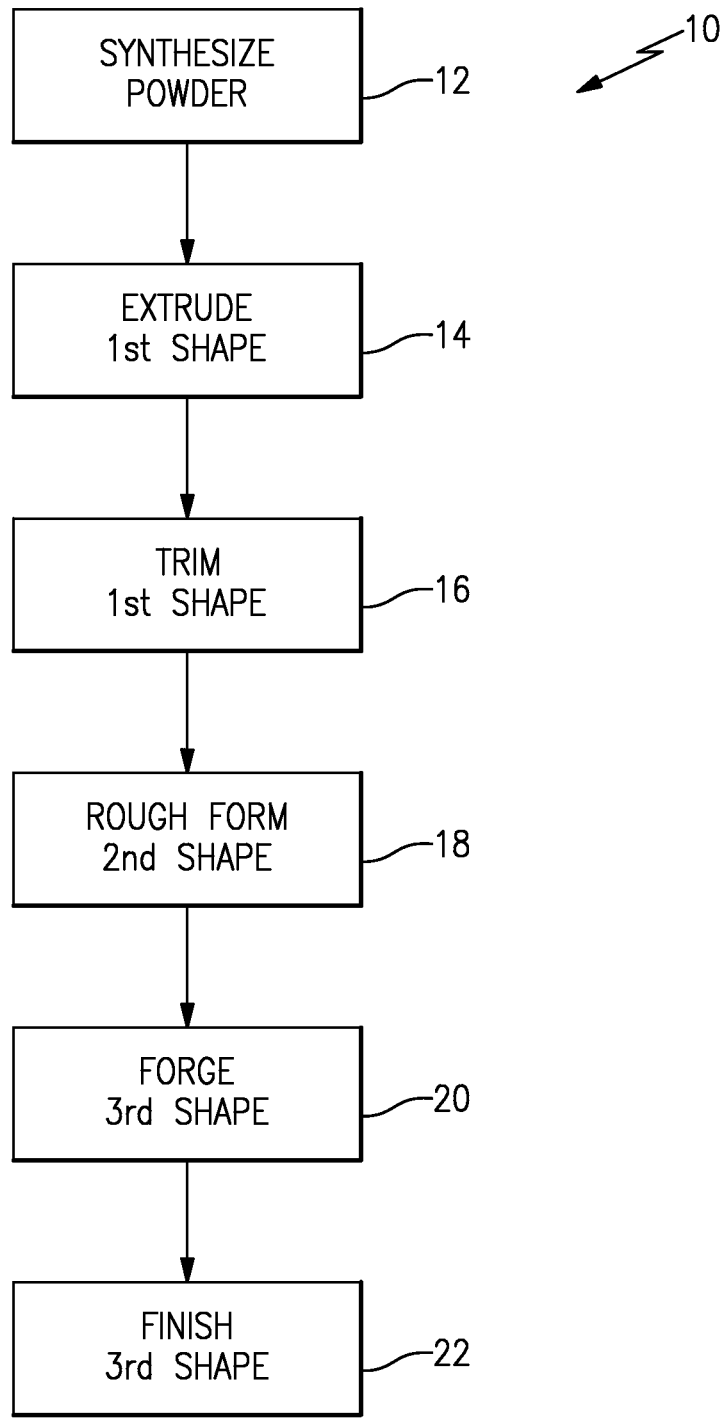
FIG. 1 is a flow chart depicting an example method of manufacturing a gas turbine engine component from a molybdenum-rich alloy.

FIG. 1 depicts a method 10 for manufacturing a gas turbine engine component from a molybdenum-rich alloy. Example components include at least portions of a combustor, a stator, a blade outer air seal, a turbine exhaust case, an augmenter, a strut, and a high temperature bearing. The disclosed manufacturing process may be used to make other components as well.

The method 10 includes a step of synthesizing a relatively high purity molybdenum powder, as indicated at block 12.

In one example, the molybdenum powder is at least 50% molybdenum by weight. In another example, the molybdenum powder is at least 75% molybdenum by weight, and in another example in a range of 94-98% molybdenum by weight.

In one example, the molybdenum powder provides the molybdenum in a spherical form, which provides homogeneous properties throughout the powder as compared to other forms of molybdenum. In one example, virgin molybdenum powder is around 150 microns (0.006 inches) in diameter. Finished powder can be between 5 and 20 times that size (750-3000 microns; 0.030-0.120 inches). In one example embodiment, the molybdenum powder is 6-12 times the size of virgin powder (900-1800 microns; 0.036-0.072 inches). In one example molybdenum processing approach, the molybdenum is synthesized in an organic compound, such as an alcohol solution containing boron nitride and silica. A solution is processed to strip most of the ceramic using a spray dry process, for example. A very high purity spherical particle molybdenum results, with the balance of the powder including silica and a non-cubic boron nitride. This balance improves the strength of the molybdenum powder.

The powder is consolidated and compacted to provide a density that is at least 75% of the finished part.

The compacted powder is extruded through a die, as indicated at block 14, to provide a first shape corresponding to a very rough component form. One example extrusion process uses forces around 5000 tons/ft$^2$ (480 MPa). Temperatures during the extrusion process are in a range of 2500-4000° F. (1370-2200° C.). In one example, the extrusion process utilizes a screw to force the compacted powder through the die.

Figure 2:
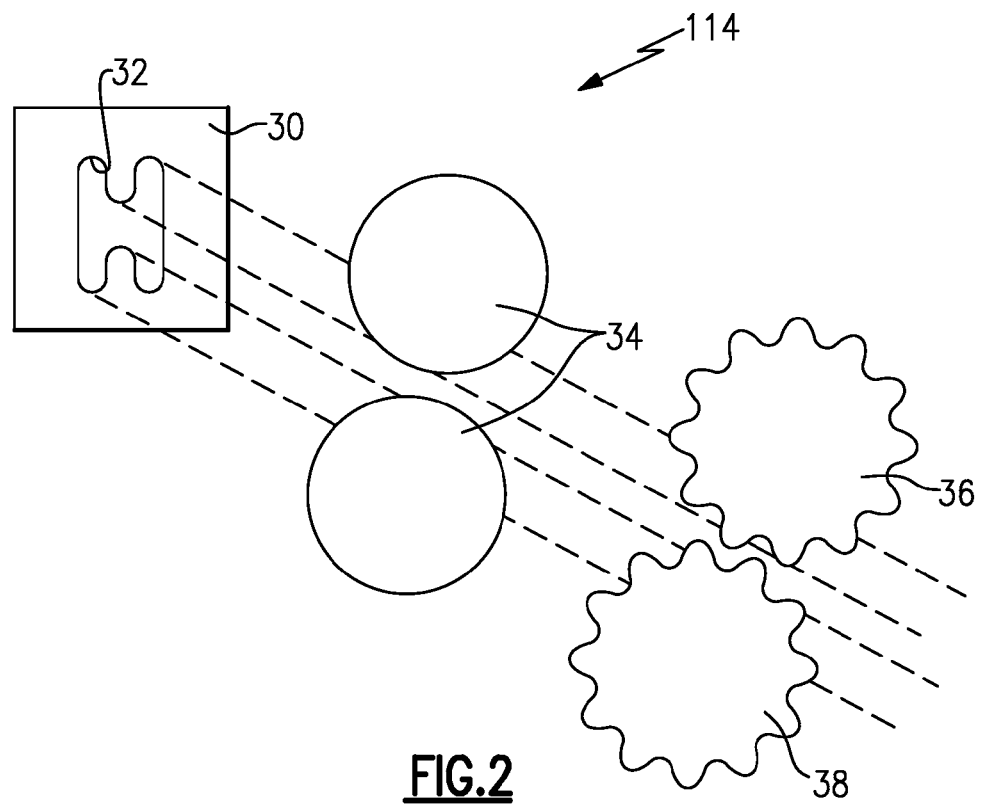
FIG. 2 is a schematic view of a corrugated extrusion process.
Figure 3:
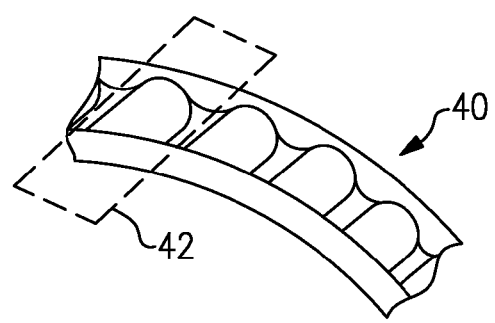
FIG. 3 is a schematic view of a cluster of vanes produced by the process shown in FIG. 2.

Another example extrusion process 114 is shown in FIG. 2. The extrusion process 114 includes a die 30 providing a rough opening 32 through which the compacted powder is extruded. In one example, the rough opening 32 corresponds to an I-beam or H-shape for producing a stator vane having integrated inner and outer platforms. The extruded shape, represented by dashed lines in FIG. 2, passes through a pair of cylindrical die plates 34 before passing through corrugated die plates 36, 38, which provide an airfoil contour. The die plate 36 provides a convex side of the stator vane airfoil, and the die plate 38 provides a concave side of the stator vane airfoil. An example cluster of vanes 40 is shown in FIG. 3. Individual vanes 42 may be separated from the cluster 40 during a trimming step for further processing.

Returning to FIG. 1, the resultant extruded first shape is trimmed, as indicated at block 16. During trimming, the extruded part is sliced into smaller parts that are near 2-5 times the weight of the final designed part. For example, an I-beam extrusion is cut into several inch long pieces with wire EDM or diamond wire sawing.

The trimmed first shape is rough form machined, as indicated at block 18, to provide a second shape that more closely approximates the finished component shape. Rough form machining generates shapes that resemble the final part. Example rough form machining processes include, but are not limited to, grinding, ECM, milling, and ultrasonic machining. The resulting airfoil shape then can be coined or forged to get additional features. During rough form machining the platforms sides and attachment features may be ground. In one example, at least 20-30% of the material as compared to the first shape is removed during the rough forming step.

The second shape is forged by a hot isothermal process, as indicated at block 20, to provide a third shape, which is a near-net shape to the finished part shape. One example forging process uses forces around 5000 tons/ft$^2$ (480 MPa). Temperatures during the forging process are in a range of 2500-4000° F. (1370-2200° C.).

The third shape is finished to provide the finished part. Example finishing processes include polishing, EDM, laser machining, electrochemical machining, ultrasonic machining, abrasive vibratory finishing or other processes, as indicated as block 22.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A method for manufacturing a gas turbine engine component from a molybdenum-rich alloy, the method comprising the steps of:
   providing a molybdenum powder of at least 50% molybdenum by weight;
   compacting the molybdenum powder to provide a density that is at least 75% of a finished part;
   extruding the compacted molybdenum powder to provide a first shape, wherein the extrusion step is performed using forces around 5000 tons/ft$^2$ (480 MPa) and under temperatures in a range of 2500-4000° F. (1370-2200° C.);
   machining the first shape to a second shape;
   hot isothermal forging the second shape to provide a third shape using forces around 5000 tons/ft$^2$ (480 MPa) and under temperatures in a range of 2500-4000° F. (1370-2200° C.); and
   applying a finishing process to the third shape to provide the finished part.

2. The method according to claim 1, wherein the molybdenum powder is at least 75% molybdenum by weight.

3. The method according to claim 2, wherein the molybdenum powder is in a range of 94-98% molybdenum by weight.

4. The method according to claim 2, wherein the molybdenum powder has a diameter in a range of 750-3000 microns (0.030-0.120 inches).

5. The method according to claim 4, wherein the molybdenum powder has a diameter in a range of 900-1800 microns (0.036-0.072 inches).

6. The method according to claim 1, wherein the molybdenum powder is in a spherical form, and the molybdenum powder includes silica and a non-cubic boron nitride.

7. The method according to claim 6, wherein the molybdenum powder is synthesized in an alcohol solution containing boron nitride and silica.

8. The method according to claim 1, wherein the extruding step includes providing an I-beam shaped die opening, and extruding the compacted powder through the opening.

9. The method according to claim 8, wherein the extruding step includes passing an extruded part through a pair of cylindrical dies.

10. The method according to claim 9, wherein the first shape provides at least a portion of at least one of a combustor, a stator, a blade outer air seal, a turbine exhaust case, an augmenter, a strut, and a high temperature bearing.

11. The method according to claim 9, wherein the extruding step includes passing the first part from the pair of cylindrical dies through a pair of corrugated dies to provide an airfoil contour on the first part.

12. The method according to claim 1, comprising a step of finished processing the third shape to provide a finished part, the finished processing step includes at least one of polishing, EDM, laser machining, ultrasonic machining, electrochemical machining and abrasive vibratory finishing.

13. A method for manufacturing a gas turbine engine component from a molybdenum-rich alloy, the method comprising the steps of:
providing a molybdenum powder of at least 50% molybdenum by weight;
extruding the molybdenum powder to provide a first shape;
machining the first shape to a second shape, wherein the machining removes at least 20% of the material as compared to the first shape; and
hot isothermal forging the second shape to provide a third shape using forces around 5000 tons/ft$^2$ (480 MPa) and under temperatures in a range of 2500-4000° F. (1370-2200° C.).

14. The method according to claim 1, wherein the finished part is one of a combustor, a stator, a blade outer air seal, a turbine exhaust case, an augmenter, a strut, and a high temperature bearing.

15. A method for manufacturing a gas turbine engine component from a molybdenum rich alloy, the method comprising:
providing a material of at least 50% molybdenum by weight;
extruding the material to provide extruded material;
machining the extruded material to a second shape; and
hot isothermal forging the second shape to provide a near-net shape of a finished part using forces around 5000 tons/ft$^2$ (480 MPa) and under temperatures in a range of 2500-4000° F. (1370-2200° C.).

16. The method of claim 15, wherein the machining step includes machining away at least 20% of the material.

17. The method of claim 15, wherein the step of providing a material is providing molybdenum powder.

18. The method of claim 15, further comprising a trimming step after the extruding step and before the machining step, wherein the trimming step includes slicing the extruded material into smaller parts that are 2-5 times the weight of the finished part.

\* \* \* \* \*